J. T. HAWKINS.
Gearing for Transmission of Power.
No. 199,203. Patented Jan. 15, 1878.
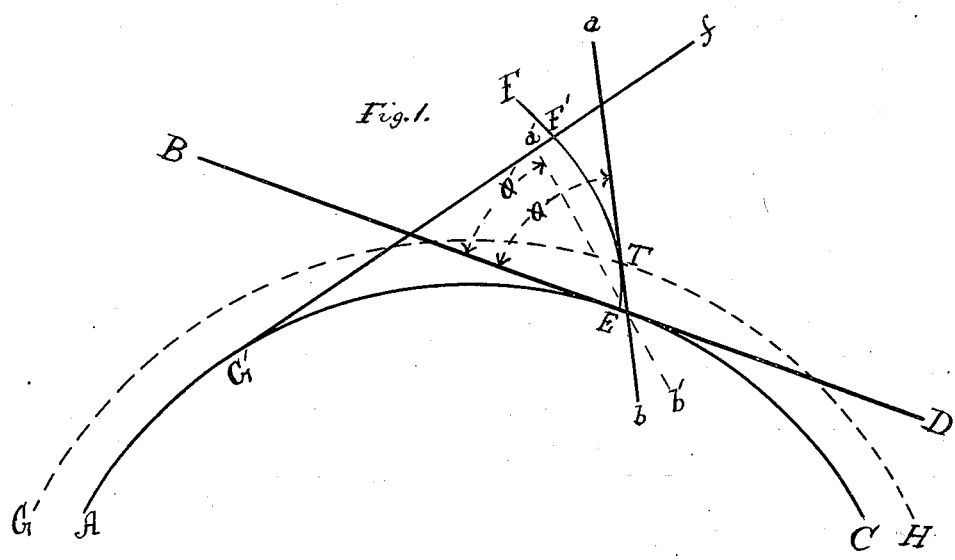
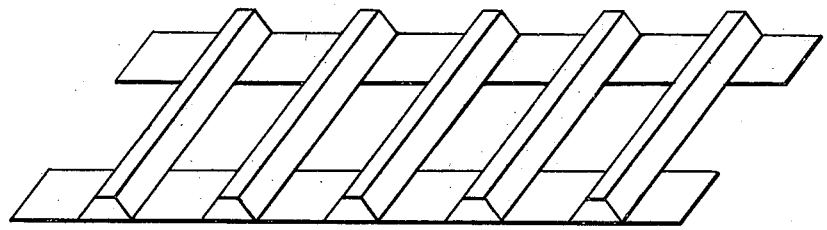
WITNESSES:
W. A. Dripps
Jos. M. White
INVENTOR
John T. Hawkins
R. R. Voorhees,
ATTORNEY

UNITED STATES PATENT OFFICE.

JOHN T. HAWKINS, OF SALISBURY, VERMONT.

IMPROVEMENT IN GEARING FOR TRANSMISSION OF POWER.

Specification forming part of Letters Patent No. 199,203, dated January 15, 1878; application filed March 28, 1877.

*To all whom it may concern:*

Be it known that I, JOHN T. HAWKINS, of Salisbury, in the county of Addison and State of Vermont, have invented certain new and useful Improvements in the Transmission of Power, which improvements are fully set forth in the following specification and accompanying drawing.

The object of my invention is to transmit power from one rotating shaft to another by means of a metallic driving-belt, consisting of one or more strips of sheet metal, having secured to them, by rivets, bolts, or other suitable means, teeth or cogs of a certain form, hereinafter described, these teeth or cogs engaging teeth or cogs of corresponding form secured to, or formed upon, the periphery of the pulleys upon which it is to run.

It is also the object to give to the teeth or cogs, both on pulley and belt, such form as will permit of their engaging one another without friction or the sliding of one tooth upon the other as they meet and engage, thus preventing the absorption of power by such friction, and the wear which would result from it. The form of tooth necessary to accomplish this will be best described as formed upon or secured to the pulley, those upon the belt being always made to conform to them.

The path described by a point in such a driving-belt, referred to the corresponding point on the periphery of the pulley which it enwraps, will be the curve known as an "involute."

In Figure 1, A E C is the periphery of the pulley; E T F, an involute, described from the point E by the point F' in the belt G' F' $f$. G T H is a part of the circumference at the tops of the teeth, and $a\ b$ a tangent to the involute at the point T. Now, a tooth upon the pulley of such form as to engage similar teeth on the belt, such as to meet and engage without rubbing or friction between them must, if their sides be curved, be such that a tangent to any part of the curve of their sides shall make a lesser angle with the tangent of the periphery of the pulley at the origin of the involute B D than does the tangent to the involute $a\ b$, as shown in the dotted line $a'\ b'$. If their sides be flat or straight, then the inclination of these sides must make a lesser angle with the tangent B D than does the tangent to the involute $a\ b$—that is to say, if the angle $Q'$ be the angle made by a tangent to any point of the curved side of a tooth or the flat side of a tooth, and the tangent B D and $Q$ be the angle made by a tangent to the involute taken at the top of the tooth with the tangent B D, then $Q'$ must always be less than $Q$. These angles vary for different diameters of pulley; but the rule here given will apply to all cases.

For wide pulleys I make the belts of two or more strips of thin sheet metal, connecting them by means of the teeth or cogs extending across the whole, as shown in Fig. 3, and secured to each tooth. For narrow belts I make them of a single narrow strip of thin sheet metal, securing the teeth at proper intervals, as shown in Fig. 2.

I make the teeth or cogs on the belt of leather, wood, or similar material, such as will prevent the jarring noise incidental to the engagement of toothed gearing where both are of metal, but do not confine myself to any particular material for them.

I do not claim an endless chain or hinged construction, nor any form of these; nor do I claim a metallic continuous belt, made, both teeth and belt, of one and the same piece of metal, as I am aware that both of these have been before used, but confine myself to a continuous band or bands of metal sufficiently thin or tempered, so as to receive no permanent set in bending to the curve of the face of the pulleys upon which it runs, with teeth or cogs of material suitable to the work the belt has to perform, such teeth or cogs secured thereto by rivets, screws, or other suitable means. I do not confine myself to the use of steel alone for the gearing-belt, as certain other materials may be used therefor, such as leather, rubber, gutta-percha, and some textile fabrics; but I prefer a thin or tempered metal which will not receive a permanent set.

This system of endless involute gearing, besides transmitting power through lines of heavy rotary shafting for driving large machinery, is abundantly capable of exerting any necessary power when adapted to the elevating to great heights of large volumes of heavy materials, heretofore so elevated by hinged or frictional conveyers only.

I claim as my invention and desire to secure by Letters Patent—

1. The hereinbefore-described new method or improvement in the art of transmitting power for operating driving-shafts of machines or lines of machinery by means of toothed pulleys upon said shafts, connected by an endless gearing of teeth or cogs, secured by rivets, bolts, or equivalent fastenings to a belt of one or more continuous strips of material, without hinged joints, preferably metal sufficiently thin or tempered to conform to the curves of said pulleys without permanent set, substantially as specified.

2. In a system of endless gearing, a pulley or pulleys having upon the face or faces thereof non-rolling, non-sliding, and frictionless teeth or cogs of the involute form described, gearing with or interlocking corresponding teeth upon an enwrapping-belt, substantially as specified.

JOHN T. HAWKINS.

Witnesses:
W. A. DRIPPS,
P. R. VOORHEES.